United States Patent [19]

Tomishima et al.

[11] Patent Number: 5,290,738
[45] Date of Patent: Mar. 1, 1994

[54] MATERIAL FOR NONMAGNETIC OXIDE SUBSTRATE AND MAGNETIC HEAD

[75] Inventors: Hiroshi Tomishima; Toshikazu Nishiyama, both of Fukaya; Nobuyuki Yamada, Hanyu; Noriyuki Kumasaka, Oume; Mitsuo Abe, Odawara, all of Japan

[73] Assignee: Hitachi Metals, Ltd., Tokyo, Japan

[21] Appl. No.: 789,688

[22] Filed: Nov. 8, 1991

[30] Foreign Application Priority Data

Nov. 16, 1990 [JP] Japan .................................. 2-311128

[51] Int. Cl.$^5$ ...................... C04B 35/46; C04B 35/49
[52] U.S. Cl. .................................. 501/104; 501/121; 501/123; 501/136
[58] Field of Search .................. 501/104, 121, 123, 136

[56] References Cited

U.S. PATENT DOCUMENTS

3,732,552  5/1973  Walraven ........................ 340/174.1

FOREIGN PATENT DOCUMENTS

0377462     7/1990  European Pat. Off. .
0425916A2   5/1991  European Pat. Off. .
61-184712   8/1986  Japan .
1-189020    7/1989  Japan .

OTHER PUBLICATIONS

IBM Technical Disclosure Bulletinm vol. 33, No. 9, Feb. 1991, "Capactive Measurements of Ferrite Head Air Bearing Surface".
IBM Technical Disclosure Bulletin, vol. 12, No. 8, Jna. 1970, "Control of Slider Aerodynamics in Disk Files".
IBM Technical Disclosure Bulletin, vol. 30, No. 8, Jan. 1988, "Flexible Magnetic Head Slider".

*Primary Examiner*—Mark L. Bell
*Assistant Examiner*—Deborah Jones

[57] ABSTRACT

A nonmagnetic oxide substrate material has a composition of 15 to 60 mol % of NiO, 10 to 70 mol % of CoO, 10 to 40 mol % of $TiO_2$, and 0.5 to 25 mol % of CaO and is formed of very minute crystal grains. Preferably MgO or $ZrO_2$ is used as an additive to the material to present a total composition containing the additive of 0.5 to 3 wt % per 100 parts by weight of the nonmagnetic oxide substrate material. Preferably, the substrate material is formulated to have a thermal expansion coefficient falling in the range of from 100 to 140 X $10^{-7}$/°C. A magnetic head using this substrate material reduces the loss in surface smoothness due to the relative slide with the magnetic tape.

3 Claims, 1 Drawing Sheet

MATERIAL FOR NONMAGNETIC OXIDE SUBSTRATE AND MAGNETIC HEAD

BACKGROUND OF THE INVENTION

Field of the Invention

This invention relates to a material for nonmagnetic oxide substrate to be used in a magnetic head coated with a soft magnetic thin film and to a magnetic head using the material.

Description of the Prior Art

As a magnetic head to be incorporated in video tape recorders ("VTR") and digital audio tape ("DAT") devices, for example, a thin-film magnetic head having a magnetic thin film made, for example, of Sendust or amorphous magnetic alloy formed on the surface of a substratal material, has found extensive utility.

In the thin-film magnetic head, the substratal material thereof is required to have a thermal expansion coefficient which closely approximates the thermal expansion coefficient of the magnetic thin film. If a large difference exists between the thermal expansion coefficients of the two components, a change in temperature has the possibility of imparting stress to the interface or union of the two materials, inducing a crack therein, and impairing the magnetic properties of the magnetic head. As necessary properties, the substratal material must maintain smoothness of surface and posses proper abrasiveness relative to the magnetic tape and exhibit ideal sliding and abrading properties to the magnetic tape.

The feasibility of cobalt (Co) type amorphous thin films and Sendust thin films as magnetic thin films of outstanding magnetic properties has been the subject of considerable study. The Co type amorphous alloys have a thermal expansion coefficient in the range of from 100 to $120 \times 10^{-7}/°C$. and the Sendust has a thermal expansion coefficient of not less than $120 \times 10^{-7}/°C$. The substratal material, therefore, is required to possess a thermal expansion coefficient closely approximating that of the thin film being considered.

As substratal materials which fulfil this requirement, $NiO-TiO_2$ type oxide materials [Japanese Patent Application Disclosure (KOKAI) SHO 62(1987)-95,810, SHO 60(1985)-204,668, SHO 60(1985)-204,699, SHO 60(1985)-246,258, SHO 60(1985)-246,259, SHO 60(1985)-264,362, SHO 60(1985)-264,363, and SHO 62(1987)-143,857] and $NiO-CoO-TiO_2$ type oxide materials [Japanese Patent Application Disclosure (KOKAI) HEI 2(1990)-154,307] have been known to the art.

Japanese Patent Application Disclosure (KOKAI) SHO 62(1987)-95,810 discloses a substratal material which is composed of 50 to 90 wt % of NiO and the balance of $TiO_2$ and a substratal material which incorporates a small amount of $ZrO_2$ in addition to NiO and $TiO_2$. The other disclosures teach substratal materials of the $NiO-TiO_2$ type additionally incorporating therein CaO, MgO, $Al_2O_3$, $ZrO_2$, $Cr_2O_3$, $CaMnO_3$, etc.

Japanese Patent Application Disclosure (KOKAI) HEI 2(1990)-154,307 discloses a substratal material which is composed of 25 to 85 mol % of Co, 0 to 50 mol % of NiO, and 5 to 20 mol % of $TiO_2$.

These known substratal materials are produced with thermal expansion coefficients closely approximating those of magnetic thin film alloys. It has been recently pointed out, however, they are deficient in smoothness of surface and abrasiveness relative to the magnetic tape and are susceptible to loss of smoothness and uneven wear against the magnetic thin film.

A magnetic head using a substratal material of a nonmagnetic substance and incorporating therein a magnetic thin film as an equivalent of a gap has been disclosed by Japanese Patent Application Disclosure (KOKAI) SHO 60(1985)-231,903, for example. This magnetic head is so constructed that at least two opposite lateral surfaces and an operating gap-forming surface of a projected part having a cross section protruding substantially in a V shape toward the magnetic recording medium are coated with a metallic magnetic substance and the metallic magnetic coating is opposed at the leading end of the projected part to the magnetic recording medium through the medium of the operating gap.

As a nonmagnetic substratal material matching a thermal expansion coefficient with the Co type amorphous thin film, the present inventors formerly invented a material substantially comprising a $NiTiO_3$ phase and NiO phase and having a composition of 60 to 77 wt % of NiO and 40 to 23 wt % of $TiO_2$ [Japanese Patent Application Disclosure (KOKAI) HEI 2(1990)-81,503]. Even the material of this composition, however, has the disadvantage in that it suffers a serious loss of surface smoothness because of its contact with the magnetic tape and it wants further improvement in abrasiveness.

An object of this invention is to provide a substratal material for the magnetic head which solves the problem of loss of surface smoothness during the slide with the magnetic tape and matches its wear with the magnetic thin film during the motion of the magnetic tape and consequently provide a magnetic head which matches its sliding and abrading property with the magnetic tape.

SUMMARY OF THE INVENTION

The material of this invention is characterized by comprising 15 to 60 mol % of NiO, 10 to 70 mol % of CoO, 10 to 40 mol % of $TiO_2$, and 0.5 to 25 mol % of CaO. The material further contemplated by this invention is characterized by having 0.5 to 3 wt % of MgO or $ZrO_2$ additionally incorporated in the aforementioned composition taken as 100 parts by weight.

DESCRIPTION OF THE PREFERRED EMBODIMENTS

Figure 1:
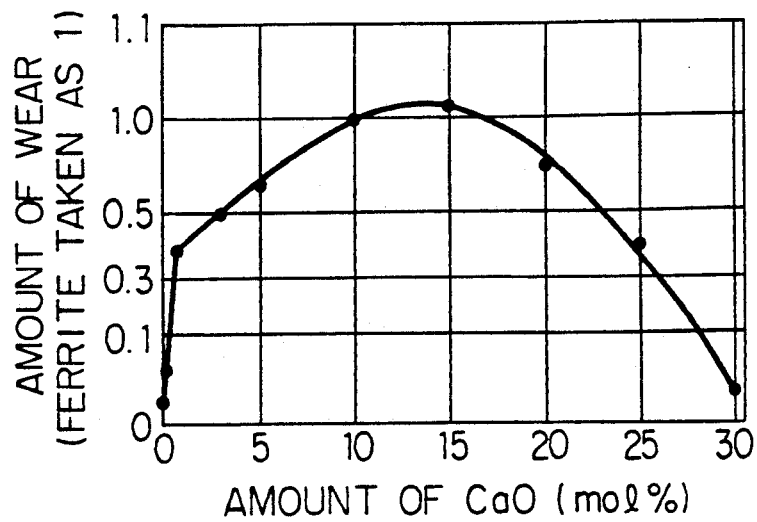
FIG. 1 is a graph showing the relation between the CaO content of the $NiO-TiO_2-CoO-CaO$ type composition and the amount of wear of the substrate after the slide with the magnetic tape; and, FIG. 2 is a graph showing the relation between the CoO content of the conventional $NiO-TiO_2$ type substratal material having CoO substituted for the NiO component and the Vickers hardness.

The conventional $NiO-TiO_2$ type substratal material, as already described, is unfit for use in the magnetic head because it suffers a serious loss of surface smoothness after a protracted slide with the magnetic tape. After various studies, the present inventors have found that the addition of CaO to the conventional substratal material allows fine division of crystal grains of the material, conspicuously decreases the loss of surface smoothness due to the slide with the magnetic tape, and renders the material fit for actual use.

It has been demonstrated that when CaO is substituted in a proportion of from 0 to 30 mol % for the NiO component of the NiO-TiO$_2$ type composition, the addition of CaO in a proportion of less than 0.5 mol % has no effect because the loss of surface smoothness due to the slide with the magnetic tape is as serious and the size of crystal grains is as large as in the NiO-TiO$_2$ type and the addition of CaO in a proportion exceeding 0.5 mol % allows fine division of crystal grains and decreases the loss of surface smoothness.

The reason for setting the upper limit of the amount of CaO used for the substitution at 30 mol % is that CaO has hygroscopicity and, therefore, is desired to be used in the smallest allowable amount. In light of the abrasiveness of the magnetic tape during its motion, the amount of CaO to be used herein is desired to be in the range of from 0.5 to 25 mol %.

What is as important during the relative motion with the magnetic tape as the aforementioned sliding property (smoothness of surface) is the ability to yield to proper wear. To be specific, the magnetic thin film and the substratal material are required to wear substantially equally. If this requirement is not satisfied, the thin film and the substrate wear in different amounts (uneven abrasion) and this difference affects the service life of the magnetic head and jeopardizes the reliability of the performance thereof. Thus, the amount of wear is desired to be on the same level as that of the magnetic ferrite substrate currently in popular use.

As a physical constant which permits estimation of the abrasiveness of the material, Vickers hardness may be cited. The Vickers hardness of the NiO-TiO$_2$ type substratal material is about 900 kgf/mm$^2$. Because of this hardness, this material sparingly wears during its relative motion with the magnetic tape. It produces uneven wear relative to the magnetic thin film. The Vickers hardness may be lowered by heightening the sintering temperature of the material. An increase in the sintering temperature, however, possibly adds to the size of crystal grains of the material and aggravates the loss of surface smoothness. The present inventors have sought a solution in the incorporation of a third component in the material. They have consequently found that repression of the Vickers hardness is attained by the addition of CoO to the NiO-TiO$_2$ type material.

The Vickers hardness of the magnetic ferrite substrate currently in popular use is in the range of from 600 to 700 kgf/mm$^2$. When the NiO -TiO$_2$ type material incorporates therein CoO in a proportion of 10 mol %, for example, as contemplated by this invention, the Vickers hardness of the produced material is about 700 kgf/mm$^2$. When the proportion of CoO is further increased up to 70 mol %, the Vickers hardness gradually decreases on the level of 600 kgf/mm$^2$. When this proportion increases past 70 mol %, the Vickers hardness falls to the level of 500 kgf/mm$^2$. The comparison of the NiO-TiO$_2$-CoO type materials having varying CoO contents with the ferrite material in terms of the amount of wear due to the relative slide with the magnetic tape reveals that the materials having CoO contents in the range of from 20 to 70 mol % wear in amounts approximately from 1/5 to 1/10 of the amount of wear of the ferrite material and the materials having CoO contents exceeding 70 mol % wear in amounts at least twice the amount of wear of the ferrite material. It has been further found that the materials having CoO contents in the range of from 20 to 70 mol % suffer loss of surface smoothness to a smaller extent due to relative motion with the magnetic tape.

This invention is characterized by decreasing the loss of surface smoothness and, at the same time, notably improving the abrasiveness by simultaneous incorporation of CaO and CoO. In the addition of CaO to the NiO-TiO$_2$-CoO type material, is about ½ of that of the ferrite when the proportion of CaO is 5 mol %, roughly equals that of the ferrite when the proportion of CaO is 10 mol % or more, continues to equal thereto when the proportion of CaO is up to 25 mol %, and causes to exist when the proportion of CaO reaches 30 mol %.

The present invention defines the contents of the components of the material by the stated ranges for the following reasons. The reason for defining the range of 0.5 to 25 mol % for the CaO content is that the loss of surface smoothness is unduly large and the amount of wear is unduly small during the relative slide with the magnetic tape when the CaO content is less than 0.5 mol % and the amount of wear is too small for the material to be suitably used in the substrate when the CaO content exceeds 25 mol %. The reason for defining the range of 10 to 70 mol % for the CoO content is that the material acquires a Vickers hardness exceeding 700 kgf/mm$^2$ and yields to wear only with difficulty when the CoO content is less than 10 mol % and the material a Vickers hardness short of 600 kgf/mm$^2$ and, therefore, wears conspicuously and suffers a sacrifice of the reliability of performance when the CoO content exceeds 70 mol %. The reason for defining the range of 10 to 40 mol % for the TiO$_2$ content is that TiO$_2$ decreases the thermal expansion coefficient and CaO conversely increases it and, therefore, that the thermal expantion deviates so much from the desired range as to render adjustment difficult when the TiO$_2$ content is less than 10 mol % and the thermal expansion coefficient falls short of $100 \times 10^{-7}/°$ C. when the TiO$_2$ content exceeds 40 mol %.

For the purpose of imparting proper abrasiveness to the substratal material of the present invention, adjustment of the Vickers hardness is important. While CaO produces virtually no change in hardness so long as the content thereof is in the stated range, CoO decreases the Vickers hardness and NiO and TiO$_2$ conversely increase it. The reason for defining the range of 15 to 60 mol % for the NiO content is that the CoO content proportionately increases and the Vickers hardness decreases below 600 kgf/mm$^2$ and the amount of wear unduly increases when the NiO content is less than 15 mol % and the Vickers hardness succumbs to adjustment only with difficulty and increases past 750 kgf/mm$^2$ and the material does not easily wear when the NiO content exceeds 60 mol %. In the present invention, the use of CaO itself brings about no problem at all.

The present inventors initially used raw materials exclusively of the guaranteed reagent grade. Since these raw materials inevitably increased the cost of the produced material, the inventors studied the usability of raw materials of the mass-produced commercial grade. When they used powdered raw material from different producers or powdered raw materials from different product lots, since the crystal grains in the sintered material were bound with weak strength, they entailed a problem of separation of loose crystal grains during the process of specular finish. They made various studies in search of a solution for this problem and consequently found that the addition of MgO or ZrO$_2$ was effective. The separation of loose crystal grains occurs conspicuosly when the amount of MgO or $ZrO_2$ to be added is less than 0.5 wt %. The produced material gains in quality and acquires a specular surface containing to void when the amount is increased. If this amount exceeds 3 wt %, the produced material forms compounds with $TiO_2$ and CaO and gives rise to extraneous phases and impairs the sliding property of the magnetic tape. Thus, the amount of MgO or $ZrO_2$ to be added is desired to be in the range of from 0.5 to 3 wt %.

The magnetic head contemplated by the present invention can be produced by forming a pair of cores with the nonmetallic oxide substrate described above, interposing a gap between the two cores, and coating the surfaces of the cores opposed to each other across the gap part with a magnetic thin film.

Now, the present invention will be described more specifically below with reference to working examples. It should be noted, however, that the present invention is not limited to these working examples.

EXAMPLE 1

Nio, $TiO_2$, CoO and $CaCO_3$ as CaO which were invariably of the guaranteed reagent grade were weighed out in varying proportions indicated in Table 1 and mixed with purified water in a ball mill. The resultant blend was dried, calcined at 900° C., pulverized in the ball mill, and dried. The dry powder consequently obtained and an aqueous 10 wt % polyvinyl alcohol solution added thereto in a proportion of 10 wt %, based on 100 wt % of the dry powder, were blended, pelletized, and then compression molded. The molded material was sintered in the open air or in an atmosphere of $N_2$ at 1200° C. to 1300° C. for two hours. The sintered material was further subjected to a hot hydrostatic molding (HIP) treatment under 1500 atm. at 1250° C. to 1300° C. for one hour.

The sintered materials obtained as described above were found by the determination of the Archimedean method to have relative densities invariably exceeding 99.5%. They were tested for thermal expansion coefficient, Vickers hardness, and amount of wear by relative motion with the magnetic tape. The results are shown in Table 1.

The thermal expansion coefficient was determined by cutting a sample from a given sintered material, setting the sample in a thermal expansion tester, heating it from normal room temperature to 500° C., and finding an average thermal expansion coefficient at temperatures between 100° C. and 400° C. The Vickers hardness was determined by measuring Vickers hardness of a sample at 10 points under a load of 300 g, and calculating the average of 10 numerical values found by the measurement. The relative motion with the magnetic tape was evaluated by the use of a commercially available VTR deck with the head part thereof modified. The duration of this test was 100 hours. The surface roughness was determined by measuring peak-to-peak widths of a sample by the use of a surface roughness tester. The amount of wear was determined by observing the surface of a sample under a microscope in comparison with a sample of ferrite material.

The thermal expansion coefficient can be mainly adjusted by the amount of $TiO_2$ and that of CaO based on the principle that this coefficient decreases in proportion as the amount of $TiO_2$ increases and it increases in proportion as the amount of CaO increases. In the present invention, therefore, the thermal expansion coefficient can be freely selected in the range of from 100 to $140 \times 10^{-7}$/° C. by adjusting the amount of $TiO_2$ and that of CoO. The Vickers hardness increases in proportion as the amount of $TiO_2$ increases and it decreases in proportion as the amount of CoO increases. The material of a proper Vickers hardness, therefore, can be produced by adjusting the amount of $TiO_2$ and that of CoO. It should be noted, however, that the Vickers hardness sharply decreases when the proportion of CoO exceeds 70 mol % and it falls to the level of about 490 kgf/mm² when the proportion rises to 75 mol %. Thus, the proportion of CoO is desired not to exceed 70 mol %. The produced material is acceptable for actual use when the surface roughness thereof after the relative slide with the magnetic tape is not more than 30 nmp-p. When the proportion of CoO is 75 mol %, the surface roughness is conspicuously heavy because the Vickers hardness is unduly small.

FIG. 1 shows the relation between the amount of CaO and the amount of wear found, among the compositions indicated in Table 1, in those compositions having a fixed $TiO_2$ content of 20 mol % and involving an equimolar ratio (1:1) of NiO and CoO. It is noted from

TABLE 1

| Composition (mol %) | | | | Thermal expansion coefficient ($\times 10^{-7}$/°C.) | Vickers hardness (kgf/mm²) | Surface roughness (nmp-p) | Amount of wear (ferrite taken as 1) |
| --- | --- | --- | --- | --- | --- | --- | --- |
| NiO | TiO2 | CoO | CaO | | | | |
| 40 | 20 | 40 | 0 | 108 | 640 | 25 | 0.11 |
| 39.9 | 20 | 39.9 | 0.2 | 108 | 640 | 24 | 0.15 |
| 39.8 | 20 | 39.7 | 0.5 | 108 | 640 | 20 | 0.37 |
| 38.5 | 20 | 38.5 | 3 | 110 | 630 | 18 | 0.49 |
| 37.5 | 20 | 37.5 | 5 | 113 | 650 | 18 | 0.6 |
| 35 | 20 | 35 | 10 | 118 | 650 | 17 | 1.0 |
| 32.5 | 20 | 32.5 | 15 | 125 | 650 | 18 | 1.1 |
| 30 | 20 | 30 | 20 | 131 | 660 | 13 | 0.7 |
| 27.5 | 20 | 27.5 | 25 | 134 | 660 | 11 | 0.39 |
| 25 | 20 | 25 | 30 | 140 | 750 | 20 | 0.13 |
| 60 | 10 | 20 | 10 | 137 | 670 | 16 | 1.1 |
| 70 | 10 | 10 | 10 | 140 | 780 | 20 | 0.2 |
| 15 | 30 | 35 | 20 | 116 | 680 | 18 | 0.7 |
| 15 | 10 | 70 | 5 | 130 | 600 | 17 | 0.8 |
| 10 | 10 | 75 | 5 | 148 | 490 | 59 | 2.7 |
| 20 | 40 | 20 | 20 | 104 | 870 | 18 | 0.5 |
| 40 | 8 | 40 | 12 | 146 | 680 | 14 | 0.7 |
| 30 | 45 | 20 | 5 | 95 | 900 | 24 | 0.15 |
| 62 | 20 | 8 | 10 | 119 | 760 | 27 | 0.12 | this diagram that the amount of wear is virtually negligible, i.e., about 1/10 of that of ferrite, when the CaO content is 0 or 0.2 mol %. The amount of wear increases in proportions as the CaO content increases. It equals that of ferrite when the CaO content is in the range of from 10 to 15 mol %. It begins to decrease when the CaO content further increases. It again is about 1/10 of that of ferrite when the CaO content is 30 mol %. To be specific, the material having this CaO content shows a negligible amount of wear.

The data of this diagram clearly indicate that in the present invention, the combined use of CoO and CaO brings about a heretofore unttainable effect.

As described above, the $NiO-TiO_2-CoO-CaO$ type substratal material of this invention can be obtained with a thermal expansion coefficient falling in the range of from 100 to $140 \times 10^{-7}$/° C. and with proper hardness. It has only a small loss of surface smoothness after the relative slide with the magnetic tape and an amount of wear equalling that of ferrite.

EXAMPLE 2

Powdered NiO, $TiO_2$, CoO, $CaCo_3$, MgO and $ZrO_2$ which were invariably of the commercially available mass-produced grade were mixed in a varying ratio shown in Table 2 and processed by following the procedure of Example 1, to produce a varying sintered material. A sample was cut from a given sintered material, polished for specular finish, and examined for possible separation of loose crystal grains. The results are shown in Table 2.

TABLE 2

| Matric composition (mol %) | | | | Additives (wt %) | | Separation of loose crystal grains |
| --- | --- | --- | --- | --- | --- | --- |
| NiO | $TiO_2$ | CoO | CaO | MgO | $ZrO_2$ | |
| 35 | 20 | 35 | 10 | 0 | 0 | yes |
| 35 | 20 | 35 | 10 | 0.3 | 0 | yes |
| 35 | 20 | 35 | 10 | 0.5 | 0 | no |
| 35 | 20 | 35 | 10 | 1.0 | 0 | no |
| 35 | 20 | 35 | 10 | 3.0 | 0 | no |
| 35 | 20 | 35 | 10 | 4.0 | 0 | Extraneous phase |
| 35 | 20 | 35 | 10 | 0 | 0.3 | yes |
| 35 | 20 | 35 | 10 | 0 | 0.5 | no |
| 35 | 20 | 35 | 10 | 0 | 2.0 | no |
| 35 | 20 | 35 | 10 | 0 | 3.0 | no |
| 35 | 20 | 35 | 10 | 0 | 4.0 | Extraneous phase |

It is noted from this table that the samples having a MgO or $ZrO_2$ content in the range of from 0.5 to 3 wt % are destitute of voids resulting from separation of loose crystals grains and that a sample having a $ZrO_2$ content of 4 wt % betrays a sign of extraneous phase and is not acceptable as a substratal material.

EXAMPLE 3

A magnetic head was produced by forming a pair of cores of a substratal materials obtained by the procedure of Example 1 and glass bonding the pair of cores. A magnetic gap was formed between the opposed surfaces of these cores and a magnetic thin film of a high dielectric constant was deposited by spattering on the opposed surfaces of the cores including the magnetic gap. The formation of this magnetic thin film need not be limited to the technique of spattering but may be attained by vacuum evaporation, CVD, or plating, for example.

This magnetic thin film is favorably produced with an alloy possessing a thermal expansion coefficient falling in the range of from 100 to $120 \times 10^{-7}$ $deg^{-1}$. A thin film of a Co type amorphous alloy answers this description. Preferably, the Co type amorphous alloy is composed of 83 to 86 wt % of Co, 10 to 12 wt % of Nd, and 2 to 7 wt % of Zr.

A C-shaped core and I-shaped core were cut from a substratal material produced by following the procedure of Example 1. On the surfaces of these cores destined to be bonded, a Co type amorphous alloy (composed of 84 wt % of Co, 12 wt % of Nb, and, wt % Zr and possessing a thermal expansion coefficient of $110 \times 10^{-7}$ $deg^{-1}$) was deposited in a thickness of 30 μm by spattering. V grooves were incised in the C-shaped core and the I-shaped core (25 grooves per block) prior to the spattering. After the spattering, projections formed by shaving the V grooves of the Co type amorphous film were used as track widths. The pair of C-shaped and I-shaped cores were glass bonded (glass composition of 60 wt % of $V_2O_3$, 20 wt % of $P_2O_5$, 15 wt % of $Ti_2O$, and 5 wt % of $Sb_2O_3$ and a bonding temperature of 450° C.). The magnetic head consequently produced showed no discernible uneven wear between the magnetic thin film and the substrate due to the relative slide with the magnetic tape and produced a surface roughness of not more than 20 nmp-p on the substrate. Thus, the magnetic head was satisfactorily acceptable for practical use.

COMPARATIVE EXAMPLE 1

This comparative experiment consisted of simple addition of CaO to the $NiO-TiO_2$ type material.

NiO, $TiO_2$ and $CaCO_3$ as CaO which were invariably of the guaranteed reagent grade were weighed out in a varying ratio indicated in Table 3 and were mixed with purified water in a ball mill. The resultant mixture was dried, calcined at 900° C., pulverized in the ball mill, and dried. The produced dry powder and an aqueous 10 wt % polyvinyl alcohol solution added thereto in a proportion of 10 wt % were blended, pelletized, and compression molded. The molded material was sintered in the open air or in an atmosphere of $N_2$ at 1200° to 1300° C. for two hours. The sintered material was subjected to a hot hydrostatic (HIP) molding treatment under 1500 atm. at 1250° to 1300° C. for one hour.

The sintered materials consequently obtained were found by the measurement of the Archimedean method to have relative densities invariably exceeding 99.5%.

The thermal expansion coefficient of a given sintered material was determined by cutting a sample from the sintered material, setting the sample in a thermal expansion meter, heating it from normal room temperature to 500° C., and calculating the average of the numerical values found at temperatures between 100° to 400° C. The Vickers hardness was determined by measuring Vickers hardness at 10 points on a sample under a load of 300 g and averaging the numerical values consequently obtained. The relative motion with the magnetic tape was evaluated by the use of a commercially available VTR deck with a head part thereof suitably modified. The duration of this test was 100 hours. The surface roughness was determined by measuring peak-to-peak widths of a sample by the use of a surface roughness tester. The amount of wear was determined by observing the surface of a sample under a microscope in comparison with a sample of ferrite material. The results are shown in Table 3. From this table, it is clearly noted that the addition of CaO to the $NiO-TiO_2$ type material permitted fine division of crystal grains in the produced material and decreased the loss of surface smoothness due to the relative slide with the magnetic tape. This material, however, showed a Vickers hardness exceeding 800 kgf/mm$^2$, an amount of wear of about 1/5 to 1/10 of that of ferrite, and very poor abrasiveness. Evidently, the use of this substrate would give rise to uneven wear.

TABLE 3

| Composition (mol %) | | | Thermal expansion coefficient ($\times 10^{-7}$ mm$^2$) | Vickers hardness (kgf/mm2) | Diameter of crystal grains (μm) | Magnetic tape | |
|---|---|---|---|---|---|---|---|
| NiO | TiO2 | CaO | | | | Surface roughness (nmp-p) | Amount of wear (ferrite as 1) |
| 76 | 24 | 0 | 116 | 850 | 12 | 70 | 0.24 |
| 75.7 | 24 | 0.3 | 116 | 830 | 10 | 50 | 0.19 |
| 75.5 | 24 | 0.5 | 116 | 860 | 5 | 29 | 0.21 |
| 73 | 24 | 3 | 120 | 800 | 4 | 18 | 0.18 |
| 68 | 24 | 8 | 127 | 850 | 4 | 16 | 0.12 |
| 61 | 24 | 15 | 135 | 840 | 4 | 16 | 0.12 |
| 56 | 24 | 20 | 142 | 850 | 4 | 14 | 0.14 |
| 46 | 24 | 30 | 150 | 850 | 3 | 14 | 0.23 |
| 30 | 40 | 30 | 110 | 900 | 3 | 18 | 0.25 |

COMPARATIVE EXPERIMENT 2

This comparative experiment consisted of examination of the effect of the addition of CoO.

Figure 2:
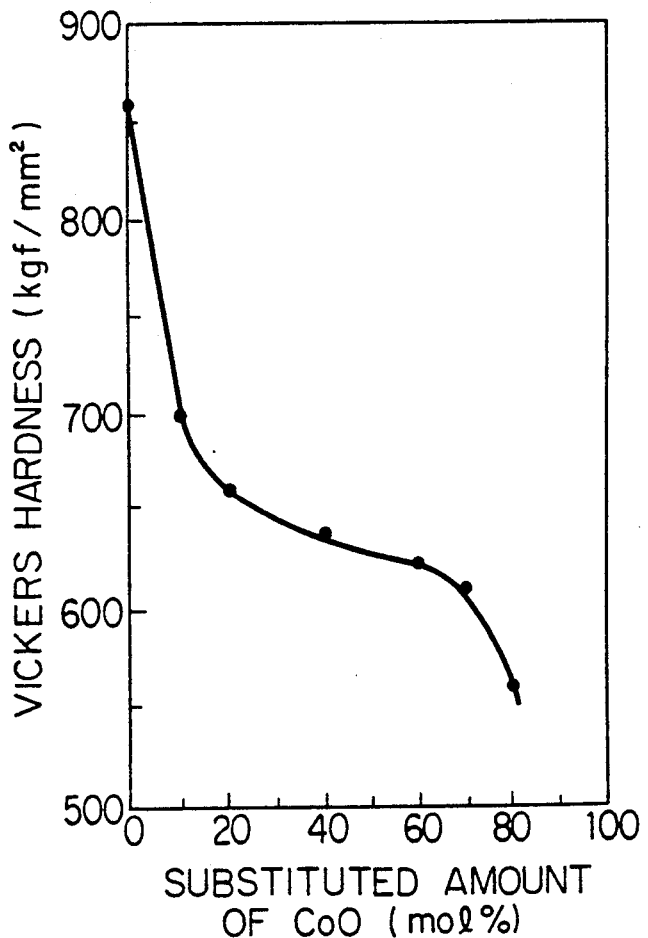

Powdered NiO, TiO$_2$ and CoO were weighed out in a varying ratio indicated in Table 4 and processed by following the procedure of Comparative Experiment 1 to produce a varying sintered material. FIG. 2 shows the Vickers hardness as the function of the amount of CoO substituted for the NiO component in the material of one test run composed of 82 mol % of NiO and 18 mol % of TiO$_2$. It is noted from the diagram that the Vickers hardness which was 860 kgf/mm$^2$ in the material composed of 82 mol % of NiO and 18 mol % of TiO decreased to 700 kgf/mm$^2$ when CoO was substituted for 10 mol % of NiO, further decreased when the amount of CoO used for the substitution was increased, and fell below 600 kgf/mm$^2$ when the proportion of CoO increased past 70 mol %. The results of the test for surface roughness and the test for amount of wear after the relative slide with the magnetic tape are shown in Table 4. The surface roughness was lowered by the substitution with CoO and the amount of wear was so small as to fall in the range of about 1/5 to 1/10 of that of ferrite. Thus, this material was worn only slightly. It is further noted that this poor abrasiveness persisted in spite of a variation in the composition ratios of TiO, TiO$_2$ and CoO.

TABLE 4

| Composition (mol %) | | | Vickers hardness (kgf/mm$^2$) | magnetic tape | |
|---|---|---|---|---|---|
| NiO | TiO2 | CaO | | Surface roughness (nmp-p) | Amount of wear (ferrite as 1) |
| 82 | 18 | 0 | 860 | 55 | 0.12 |
| 72 | 18 | 10 | 700 | 28 | 0.14 |
| 62 | 18 | 20 | 660 | 22 | 0.19 |
| 42 | 18 | 40 | 630 | 19 | 0.18 |
| 22 | 18 | 60 | 620 | 18 | 0.21 |
| 12 | 18 | 70 | 610 | 20 | 0.22 |
| 2 | 18 | 80 | 560 | 28 | 1.9 |
| 45 | 10 | 45 | 600 | 30 | 0.20 |
| 70 | 20 | 10 | 780 | 21 | 0.23 |
| 50 | 30 | 20 | 700 | 20 | 0.19 |
| 30 | 35 | 35 | 620 | 20 | 0.18 |
| 10 | 45 | 45 | 740 | 28 | 0.13 |

As described in detail above, the nonmagnetic oxide substratal material of this invention has a composition of NiO-TiO$_2$-CoO-CaO and shows a small loss of surface smoothness due to the relative slide with the magnetic tape and possesses the same abrasiveness as the ferrite substrate currently in popular use in the magnetic head. The magnetic head using this substratal material, therefore, enjoys a long service life and excels in reliability of performance. Thus, the present invention has a high economic utility.

What is claimed is:

1. A nonmagnetic oxide substrate material comprising:
   15 to 60 mol % of NiO, 10 to 70 mol % of CoO, 10 to 40 mol % of TiO$_2$, and 0.5 to 25 mol % of CaO.

2. A nonmagnetic oxide substrate material according to claim 1, wherein MgO or ZrO$_2$ is added as an additive to the material to present a total composition containing 0.5 to 3 wt % of the additive per 100 parts by weight of the substrate material.

3. A non-magnetic oxide substrate material according to claim 2, wherein the thermal expansion coefficient is in the range from 100 to 140$\times 10^{-7}$/° C.

* * * * *

UNITED STATES PATENT AND TRADEMARK OFFICE
CERTIFICATE OF CORRECTION

PATENT NO. : 5,290,738
DATED : March 1, 1994
INVENTOR(S) : Hiroshi TOMISHIMA et al.

It is certified that error appears in the above-indentified patent and that said Letters Patent is hereby corrected as shown below:

Column 4, line 11, "causes" should be --ceases--

Signed and Sealed this

Nineteenth Day of September, 1995

Attest:

BRUCE LEHMAN

Attesting Officer

Commissioner of Patents and Trademarks